United States Patent
Wright et al.

(10) Patent No.: US 8,794,634 B1
(45) Date of Patent: Aug. 5, 2014

(54) SEAL ASSEMBLY WITH ANTI-ROTATION PIN FOR HIGH PRESSURE SUPERCRITICAL FLUIDS

(75) Inventors: Steven A. Wright, Albuquerque, NM (US); Robert L. Fuller, Conifer, CO (US)

(73) Assignee: Sandia Corporation, Albuquerque, NM (US)

( * ) Notice: Subject to any disclaimer, the term of this patent is extended or adjusted under 35 U.S.C. 154(b) by 990 days.

(21) Appl. No.: 12/882,492

(22) Filed: Sep. 15, 2010

(51) Int. Cl.
*F16J 15/44* (2006.01)
(52) U.S. Cl.
USPC .......................... 277/372; 277/370; 277/373
(58) Field of Classification Search
USPC .......... 277/347, 370, 372, 373, 375, 445, 447
See application file for complete search history.

(56) References Cited

U.S. PATENT DOCUMENTS

| | | | |
|---|---|---|---|
| 2,044,692 A * | 6/1936 | Huhn .............................. | 277/415 |
| 3,599,990 A * | 8/1971 | Greiner et al. ................. | 277/370 |
| 3,617,068 A | 11/1971 | Sprenger | |
| 3,979,104 A * | 9/1976 | LaCoste et al. ............... | 251/214 |
| 4,722,663 A | 2/1988 | Swearingen | |
| 5,015,000 A | 5/1991 | Perini | |
| 5,029,876 A | 7/1991 | Orlando et al. | |
| 5,403,019 A | 4/1995 | Marshall | |
| 5,487,549 A * | 1/1996 | Dalton et al. ................. | 277/413 |
| 5,527,045 A | 6/1996 | Pondelick et al. | |
| 6,210,103 B1 * | 4/2001 | Ramsay ......................... | 415/112 |
| 6,547,522 B2 | 4/2003 | Turnquist et al. | |
| 6,692,006 B2 * | 2/2004 | Holder .......................... | 277/346 |
| 7,175,388 B2 | 2/2007 | Labbe et al. | |

OTHER PUBLICATIONS

Bruckner, Robert J. "Windage Power Loss in Gas Foil Bearings and the Rotor-Stator Clearance of High Speed Generators Operating in High Pressure Environments". Proceedings of ASME Turbo Expo 2009: Power for Land, Sea and Air, Jun. 2009.
Egli A. "The Leakage of Steam Through Labyrinth Seals," *Transactions of the American Society of Mechanical Engineers*, vol. 57 (1935), pp. 115-122.
Martin, H. M. "Labyrinth Packings." *Engineering*, vol. 85 (Jan. 10, 1908), pp. 35-36.
Selvaraji, M. et al. "Optimization of Labyrinth Seal for Screw Compressor." 2007 ASME-JSME Thermal Engineering Summer Heat Transfer Conference, Jul. 2007.
Vermes, G. "A Fluid Mechanics Approach to the Labyrinth Seal Leakage Problem," *Journal of Engineering for Power*, vol. 83 (Apr. 1961), pp. 161-169.

* cited by examiner

*Primary Examiner* — Gilbert Lee
(74) *Attorney, Agent, or Firm* — Daniel J. Jenkins (57) ABSTRACT

A seal assembly for sealing a machine with a first chamber and a second chamber is provided. A rotating shaft extends through the first and second chambers, and rotates therein. The seal assembly has a seal housing, a seal ring and a seal pin. The seal housing is positionable in the machine housing. The seal housing has a seal pocket extending into a fluid side thereof, and a housing receptacle extending into an inner diameter thereof at the seal pocket. The seal ring is positionable in the seal pocket of the seal housing for forming a seal therewith. The seal ring has a ring receptacle extending into an outer diameter thereof. The ring receptacle is positionable adjacent to the housing receptacle for defining a pin hole therebetween. The seal pin is loosely positionable in the pin hole whereby movement about the seal ring is accommodated while preventing rotation thereof.

21 Claims, 6 Drawing Sheets

SEAL ASSEMBLY WITH ANTI-ROTATION PIN FOR HIGH PRESSURE SUPERCRITICAL FLUIDS

STATEMENT OF GOVERNMENT INTEREST

This invention was developed under Contract DE-AC04-94AL85000 between Sandia Corporation and the U.S. Department of Energy. The U.S. Government has certain rights in the invention.

BACKGROUND OF THE INVENTION

1. Field of the Invention

The present invention relates generally to the field of machinery. More particularly, the invention relates to techniques for sealing, machinery.

2. Background of the Related Art

Turbomachinery, such as a turbine, centrifugal pump, compressor, and/or other machine, is typically used to transfer energy between a rotating shaft and a fluid (e.g., liquid or gas). Seals, such as lip, brush, lift-off, floating, labyrinth, or other seals, are often positioned about the rotating shaft to restrict the passage of fluid through the turbomachinery. Seals are often made of elastomeric, abradable, or other materials, and may be subject to leakage, wear, vibration, over-heating, etc. Moreover, some turbomachinery is used in extreme operating conditions (e.g., high vibration), extreme contact (e.g., involving high contact speeds, or high density fluids, such as supercritical $CO_2$ or other supercritical fluids), extreme environmental conditions (e.g., high pressure, high temperature, high density, etc.), and/or other 'extreme conditions.' Such extreme conditions may increase machine malfunctions, such as the instance of leakage about the seals, seal failure, and/or vibrations resulting in bearing failure.

Various seals and/or leakage properties have been described, for example, in Adolph Egli, *The Leakage of Steam Through. Labyrinth Seals*, American Society of Mechanical Engineers, Vol. 57, pp. 115-22 (1935); Robert J. Bruckner, *Windage Power Loss in Gas Foil Bearings and the Rotor Stator Clearance of High Speed Generators Operating in High Pressure Environments*, Proceedings of ASME Turbo Expo 2009: Power for Land, Sea and Air, Orlando, Fla. (Jun. 8-12, 2009); and Geza Vermes, *A Fluid Mechanics Approach to the Labyrinth Seal Leakage Problem, Transactions of the ASME* (1959): Series A, pp. 161-69 (April 1961). Attempts have been made to address seal performance and/or leakage as described, for example, in U.S. Pat. No. 5,029,876, and in H.M. Martin, Labyrinth Packing, Engineering, pp. 35-36 (January 1908); and M. Selvaraji et al., *Optimization of Labyrinth Seal for Screw Compressor,* 2007 ASME-JSME Thermal Engineering. Summer Heat Transfer Conference, Vancouver, British Columbia (Jul. 8-12, 2007).

Despite the previous advancements in seal technology, there remains a need to provide techniques for effectively sealing machinery. It is desirable that such techniques assist in controlling leakage in even extreme conditions. It is further desirable that such seals may be usable in a variety of tolerances, configurations and/or applications. Preferably, such techniques are capable of high durability, flexible operation, strength, and/or wear resistance, and/or otherwise enhanced operation. The present invention is directed at achieving such capabilities.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

FIGS. 2A and 2B are schematic views of a seal assembly positioned about a rotating shaft.

DETAILED DESCRIPTION OF THE INVENTION

Presently preferred embodiments of the invention are shown in the above-identified Figures and described in detail below.

Figure 1:
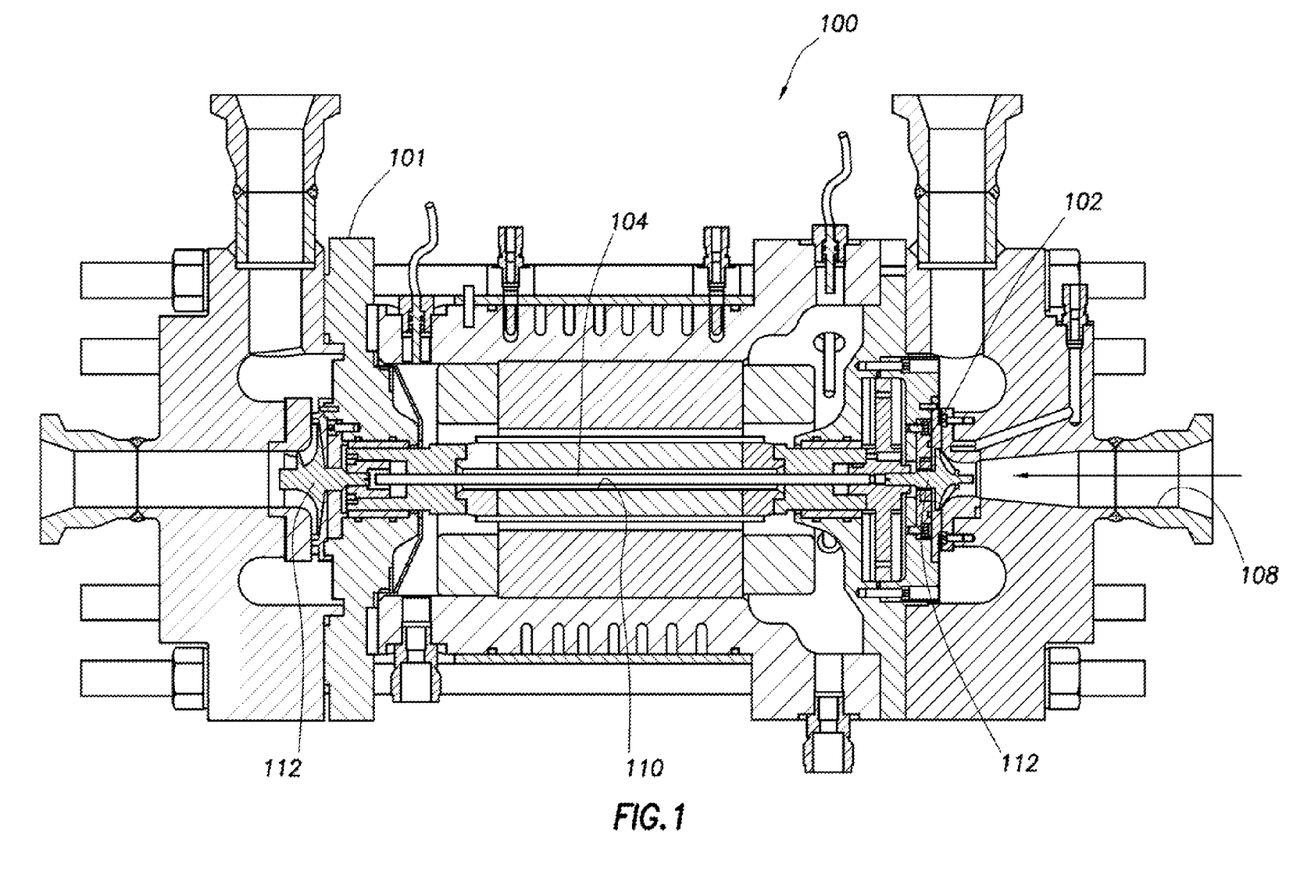
FIG. 1 shows a longitudinal, cross-sectional view of a machine having a seal assembly therein in accordance with the present invention.

FIG. 1 is a longitudinal cross-sectional view of machine 100 with a seal assembly 102 therein. The machine 100 may be a conventional turbine, centrifugal pump, compressor or other machine or turbomachine used, for example, for power conversion, refrigeration, pumping of fluids, carbon capture, chemical processing, etc. The machine 100 includes a housing 101 with a rotating shaft 104 therethrough. Preferably, the machine 101 is capable of transferring energy therethrough via the rotating shaft 104. The housing 101 has a high pressure chamber 108 separated from a low pressure chamber 110 by the seal assembly 102. The high/low pressure chambers 108, 110 may have the same or different fluids therein. The fluids may be liquids, gases, trans-critical fluids, or supercritical fluids.

The rotating shaft 104 extends through the housing 101 and the seal assembly 102. The rotating shaft 104 rotates in both the high/low pressure chambers 108, 110. One or both ends of the rotating shaft 104 may be provided with a rotating member 112. The rotating member 112 may be, for example, a propeller, fan, turbine, or other rotating mechanism (not shown). One or both of the rotating members 112 may be used to allow power to be transferred through housing 101 from the high pressure chamber 108 to the low pressure chamber 110, or from the low pressure chamber 110 to the high pressure chamber 108.

An end of the rotating shaft 104 may be linked to other driven devices (not shown), such as an engine, motor, gear box, compressor, pump, generator or other rotary driven device, for activation thereof. In this manner, the machine 100 may transfer energy from the fluid in the high pressure chamber 108 to such driven device using the rotating shaft 104. Alternatively, the machine 100 may transfer power via the rotating shaft 104 through the housing 101, and to a fluid device (not shown) located, for example, in high pressure chamber 108.

The seal system 102 is configured to reduce and control the leakage of fluid through the machine 100, and to accommodate movement within the machine 100 caused by, for example, misalignment and shaft oscillation. The seal system 102 may be positioned in the machine housing 101 between (or near) the high/low pressure chambers 108, 110. The seal system 102 also may be positioned with the rotating shaft 104 extending therethrough. The seal system 102 is preferably configured to reduce or control leakage between the high/low pressure chambers 108,110, as will be described more fully herein.

The seal assembly 102 may be, for example, a 'floating,' 'self-adjusting' seal assembly. The seal assembly 102 is secured about the rotating shaft 104, but is configured to have sufficient movement within the housing 101 to drift or float about the rotating shaft 104. This 'floating' movement allows the seal assembly 102 to 'self-adjust' or move about the rotating shaft 104 in response to vibration, wobble, offset or other movement about the machine 100, as will be described further herein.

The seal assembly 102 is preferably usable in even extreme conditions. For example, an extreme fluid, such as a supercritical $CO_2$, may be passed through the housing 101 adjacent the seal assembly 102, as indicated by the arrow. The machine 100 may be operating in, for example, high-pressure, high-density (e.g., approaching or exceeding the density of water), high-shaft speed, low leakage or other extreme conditions. The seal assembly 102 may be configured, for example, to provide for low leakage in high-pressure, high-density systems operating at high differential pressure of about 500-3000 psi (3,400-20,000 KPa) or more across the seal, and/or in high temperature fluids on a high-speed rotating shaft. The seal assembly 102 may be operable, for example, with supercritical $CO_2$ at pressures of up to 3000 psia (30,000 KPa), with differential pressures of up to about 2800 psia (19,000 KPa), and/or at shaft speeds of up to about 75,000 rpm. Preferably, the seal assembly 102 may be configured with independent selection of clearances and/or gaps to enhance operation in even the harshest conditions, as will be described more fully herein.

Figure 2A:
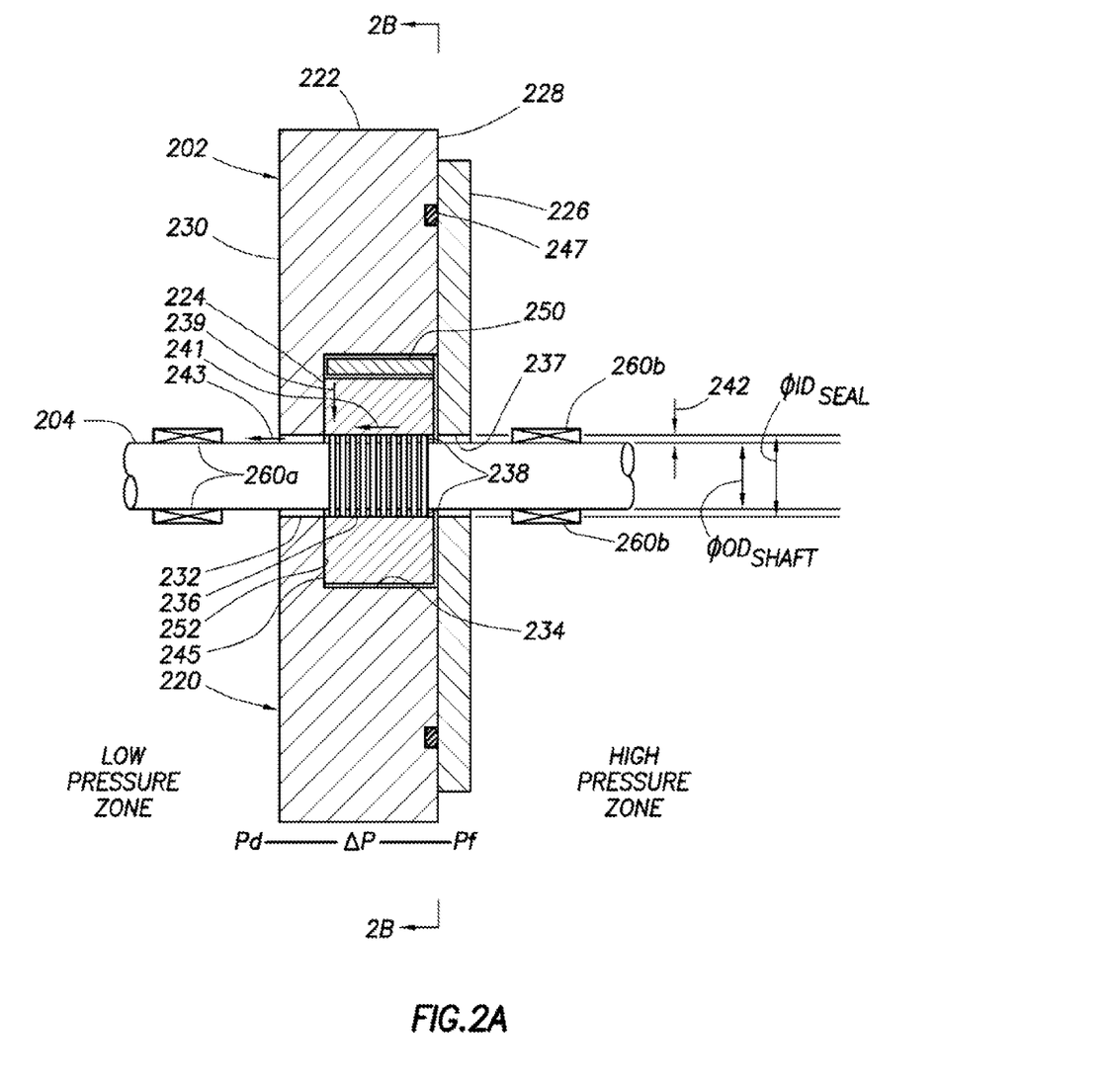
FIG. 2A shows a longitudinal cross-sectional view of the seal assembly of FIG. 2A taken along line 2A-2A.
Figure 2B:
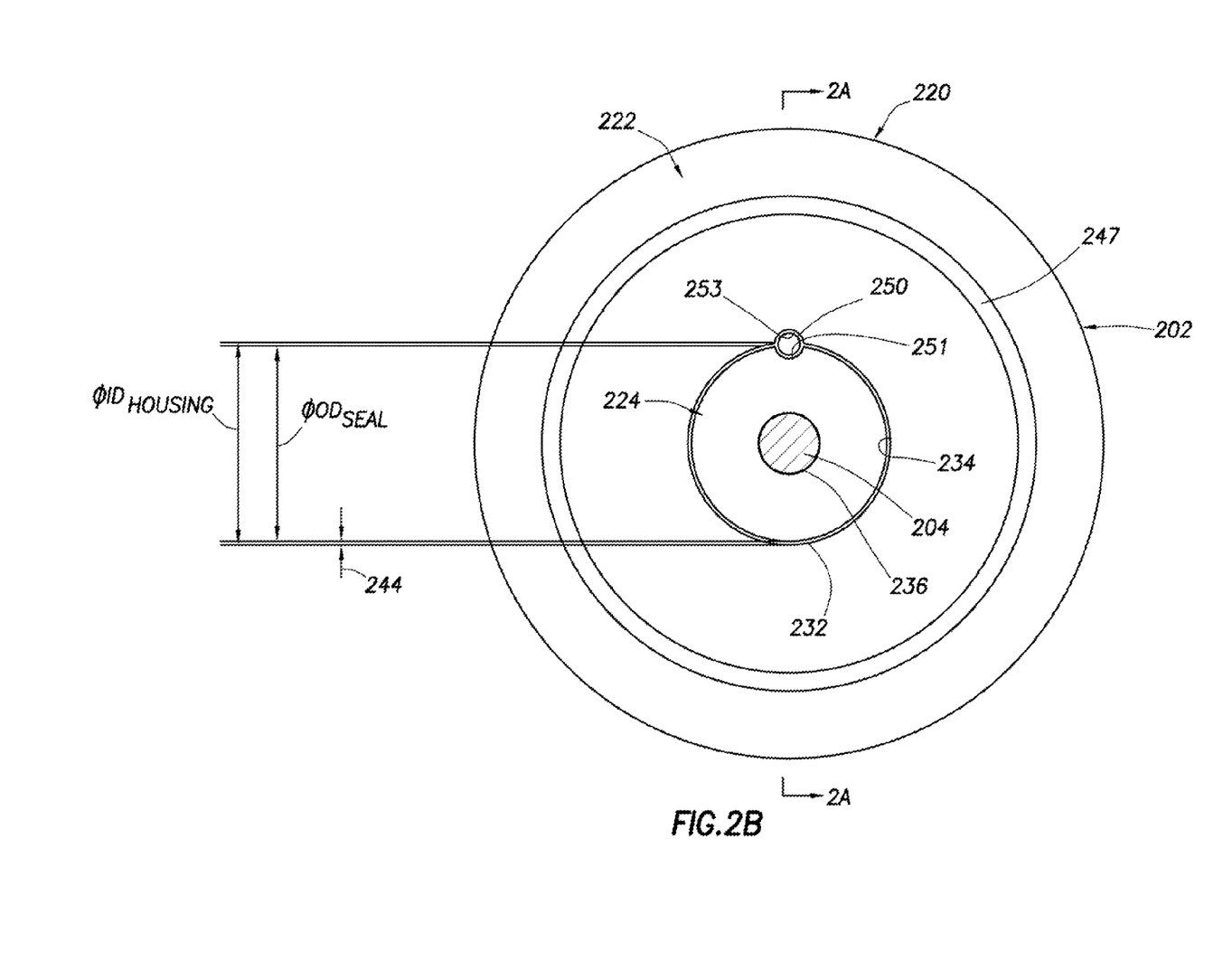
FIG. 2B shows a radial cross-sectional view of the seal assembly of FIG. 2A taken along line 2B-2B

FIGS. 2A and 2B are schematic views of a seal assembly 202 positioned about a rotating shaft 204. FIG. 2A shows a longitudinal cross-sectional view of the seal assembly 202 positioned about the rotating shaft 204. FIG. 2B shows a radial cross-sectional view of the seal assembly 202 and the rotating shaft 204 of FIG. 2A taken along line 2B-2B. As shown in these figures, the seal assembly 202 is configured to receive the rotating shaft 204 and form a seal thereabout. The seal assembly 202 and rotating shaft 204 may be similar to the seal assembly 102 and rotating shaft 104 of FIG. 1.

As shown in FIGS. 2A and 2B, the seal assembly 202 includes a seal package 220. The seal package includes a seal housing 222, a seal ring 224, and a seal face plate 226. The seal housing 222 is positionable in the housing of a machine, such as the housing 101 of the machine 100 of FIG. 1. The seal package 220 may be configured as a floating, self-adjusting shaft-seal assembly that can accommodate extreme conditions, such as misalignments, off-center rotation, and vibrations. The seal package 220 may also accommodate, for example, movement of the rotating shaft 204 resulting from shaft vibrations or out of balance forces.

The seal housing 222 may be a circular member made of steel (or other inflexible metal or material), with a high pressure side 228 and a low pressure side 230. The seal housing 222 is preferably made of a size and thickness to fit within the housing 101 (FIG. 1), and to withstand the pressure forces generated by a differential pressure ΔP (difference between pressure ($P_h$) of the high pressure side 228 and a pressure ($P_l$) of the low pressure side 230) thereacross. The seal housing 222 may also be provided with a hole 232 therein for passage of the rotating shaft 104 therethrough. A pocket 234 may extend through the high pressure side 228 and into the seal housing 222.

The seal ring 224 is shown as being positioned in the pocket 234 of the seal housing 222. The pocket 234 is considered an 'oversized' pocket, larger than the seal ring 224 positioned therein. The seal ring 224 is preferably movable within the oversized pocket 234 such that the seal ring 224 'floats' therein. The seal ring 224 may be a circular member made of a flexible material (e.g., rubber or plastic), abradable material (e.g., graphite, metallic and ceramic), composite materials (e.g., as FLUORSINT™, VESPEL™, TEFLON™, polyimide, etc.) and/or other suitable material(s). The selected material preferably enables the seal ring 224 to deform within the oversized pocket 234 and provide the desired seal capabilities. The seal ring 224 may be made of, for example, graphite or other abrasion material that can withstand temperatures greater than 1000 degrees F. (810.78 degrees K), and may act as a lubricant which does not melt or clog under extreme conditions. The seal ring 224 may have a thickness and strength selected to withstand a differential pressure ΔP thereacross. The seal ring 224 has a hole 236 therein for passage of the rotating shaft 204 therethrough.

The rotating shaft 204 may be provided with teeth 238 that engage the seal ring 224 about the hole 236. The rotating shaft 204 can have any number of teeth 238 on an outer surface thereof to provide a small contact area between the rotating shaft 204 and the seal ring 224. The teeth 238 may be configured to reduce contact loads and/or heating through the machine 101 and/or seal assembly 202. Multiple teeth 238 may be used to "abrade" into the seal ring 224 a small amount, and to reduce the leakage flow rate.

The seal face plate 226 is positionable adjacent the high pressure side 228 of the seal housing 222. The seal face plate 226 may be a circular member made of steel (or other inflexible metal or material). The seal face plate 226 is depicted in FIG. 2A as having a diameter less than the diameter of the seal housing 222, but may optionally have a larger perimeter than that of the seal housing 222. Like the seal housing 222, the seal face plate 226 is preferably made of a size and thickness to fit within the machine housing 101, and to withstand the pressure forces generated by a differential pressure (ΔP) thereacross. The seal face plate 226 has a hole 237 therein for passage of the rotating shaft 204 therethrough. The seal face plate 226 is preferably positionable adjacent the seal housing 222 to provide support to the seal ring 224 and/or to retain the seal ring 224 within the oversized seal pocket 234.

The seal ring 224 is positioned in the seal pocket 234 of the seal housing 222 with the rotating shaft 204 extending therethrough. A back surface 245 of the seal ring 224 is pressed against a back wall 252 of the pocket 234 of the seal housing 222 by the pressure differential ΔP across the seal package 220. The urging of the seal ring 224 against the seal housing 222 preferably prevents bypass leakage between the seal ring and the oversized pocket 234 of the seal housing 222 as indicated by the radial arrow 239. The urging of the seal ring 224 against the seal housing 222 also preferably prevents seal leakage between the seal ring 224 and the rotating shaft 204 as indicated by the longitudinal arrow 241. In low pressure applications, the seal ring 224 may be an o-ring seal. An o-ring 247 may optionally be provided in-between seal housing 222 and seal face plate 226 to provide further sealing capability.

A shaft (or vibrational or diametrical) clearance ($c_{shaft}$) 242 is preferably provided between the seal ring 224 and the rotating shaft 204. The shaft clearance ($c_{shaft}$) 242 is the space between an outer diameter ($\phi OD_{shaft}$) of the rotating shaft 204 and an inner diameter ($\phi ID_{seal}$) of the seal ring 224 as provided in the following equation:

$$c_{shaft} = \phi ID_{seal} - \phi OD_{shaft} \qquad \text{Equation 1}$$

A gap ($g_{shaft}$) between the rotating shaft 204 and the seal ring 224 is one half of the shaft (diametrical) clearance as provided by the following equation:

$$g_{shaft} = (c_{shaft})/2 \qquad \text{Equation 2}$$

The shaft clearance 242 defines a flow path 243 for leakage of fluid from the high pressure chamber 108 to the low pressure chamber 110 of the housing 101 (FIG. 1). The shaft clearance 242 is preferably small enough to minimize and control the leakage flow, but large enough to accommodate radial motion, vibrations, off-center spinning and other movement of the rotating shaft 204. This shaft clearance 242 may be selected to define the effective flow area and/or flow rate for leakage through the seal package 220. Typically, this shaft clearance 242 is preferably selected to be small. For example, the shaft clearance 242 may be set at about 0.0015 inches (0.0381 mm) for a 0.5 inch (12.7 mm) outer diameter ($\phi OD_{shaft}$) the rotating shaft 204. The total leakage may be essentially controlled by defining the shaft clearance 242 between the rotating shaft 204 and the seal ring 224.

A seal (or radial or leakage) clearance 244 ($c_{seal}$) is preferably provided between the seal ring 224 and the seal housing 222 in the oversized pocket 234. The seal clearance 244 is the space between an outer diameter ($\phi OD_{seal}$) of the seal ring 224 and an inner diameter ($\phi ID_{housing}$) of the housing 222 at the oversized pocket 234 as provided in the following equation:

$$c_{seal} = \phi ID_{housing} - \phi OD_{seal} \qquad \text{Equation 3}$$

A seal gap ($g_{seal}$) between the seal ring 224 and the housing 222 is one half of the shaft (diametrical) clearance as provided by the following equation:

$$g_{seal} = (c_{seal})/2 \qquad \text{Equation 4}$$

The seal clearance 244 defines a space to permit movement of the seal ring 224 within oversized pocket 234 as vibration or other movement occurs in the seal package 220. The seal clearance 244 is preferably sufficiently large to accommodate vibrations through the machine housing 101 and the seal package 220. This seal clearance ($c_{seal}$) 244 between the seal ring 224 and the housing 222 is typically selected to be sufficiently large to avoid the magnitude of vibrations caused by out of balance forces through the machine 101, and by the fundamental modes of the rotating shaft 204. The seal clearance 244 defines a magnitude of vibration that may be tolerated. The seal clearance 244 in the oversized pocket 234 of the housing 222 may be set at, for example, about 0.010 inches (0.254 mm).

The shaft clearance 242 ($c_{shaft}$) and the seal clearance 244 ($c_{seal}$) may be independently adjusted to achieve the desired operability. For example, the clearances 242, 244 may be selected to allow the seal package 220 to vibrate while keeping the shaft clearance ($c_{shaft}$) very tight. In this manner, the seal and shaft clearances 242, 244 may be selected to achieve the desired leakage and/or vibrational clearances. The selected clearances 242, 244 preferably optimize the operation of the machine 101. Selected components of the seal package 220 and related clearances 242, 244 may be operational, for example, for sealing spinning shafts in supercritical fluids (or gas or liquid systems) at high pressure. In some cases, the selected configuration may be used to create low pressure regions in the machine 101 to reduce windage losses and increase efficiency. The seal package 220 may be especially useful in applications that require shaft seal systems with bearings that may accommodate relatively large radial displacements or vibrations.

Bearings 260a, 260b may be provided to support the rotating shaft 204 during operation. Bearing 260a may be placed in the low pressure chamber 110 to minimize windage/friction losses. Bearing 260b may also be placed in the high pressure chamber 108. One or more bearings 260a,b may be positioned about the rotating shaft 204 to provide support thereto. The bearings 260a,b may be, for example, gas-foil, magnetic, soft mounted tilt-pad hydrodynamic, or hydrostatic gas bearings.

The operation of the seal package 220 in the machine 101 may be affected by movement of the components of the seal package 220. A pin 250 may optionally be positioned between the seal ring 224 and the seal housing 222 to prevent rotation thereof. As shown in FIGS. 2A and 2B, pin 250 is positioned in the shaft clearance 242 between the seal ring 224 and the seal housing 222, and between the seal face plate 226 and the oversized pocket 234 of the seal housing 222. The seal ring 224 and the seal housing 222 may each be provided with a pin receptacle 251, 253, respectively, for receiving the pin 250. The pin receptacle 251 may be an inlet extending into the outer diameter of the seal ring 224. The pin receptacle 253 may be an inlet extending into the inner diameter of the seal housing 222. The pin receptacles 251, 253 are preferably arcuate shaped inlets (e.g., a semi-circular cut-out) that conform to the shape of the pin 250.

The two pin receptacles 251, 253 in combination define an oversized pin hole for loosely receiving the pin 250. Preferably, the pin receptacles 251, 253 are large enough to allow movement of the pin 250 therein, while still preventing rotation of the seal ring 224 about the housing 222. The pin receptacle 251 may extend over the width of the seal ring 224. The pin receptacle 253 may extend over the width of the seal housing 222 at the seal pocket. This configuration allows the seal pin 250 to move between the seal housing 222 and the seal face plate 226.

The seal pin 250 may be used to 'loosely pin' seal ring 224 within the housing 222. Like the pocket 234, the pin and housing receptacles 251, 253 may optionally be oversized to permit some room for movement of the pin 250 therein. The pin 250 is preferably positioned between the seal ring 224 and the seal housing 222 such that the seal ring 224 is prevented from rotating in the seal housing 222, while permitting the rotating shaft 204 to move (e.g., vibrate) in two dimensions. This 'loosely pinned' configuration is preferably capable of accommodating various movement of the system, while maintaining the position and operation of the components of the seal package 220. While a pin is depicted, a keyway or other locking mechanism that provides a loose configuration to prevent seal ring rotation during shaft rotation may be used.

Figure 3A:
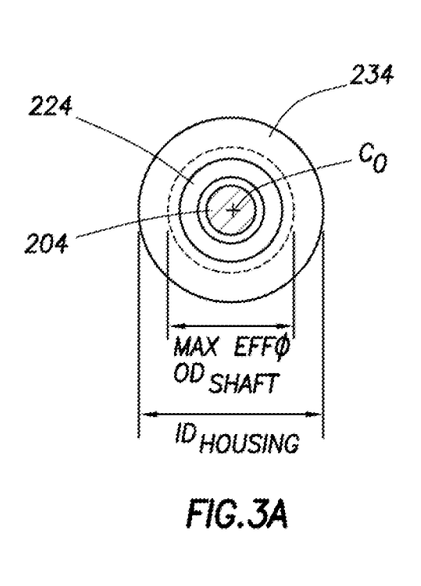
FIGS. 3A-3C are schematic diagrams depicting the operation of the seal assembly of FIG. 2A.
Figure 3B:
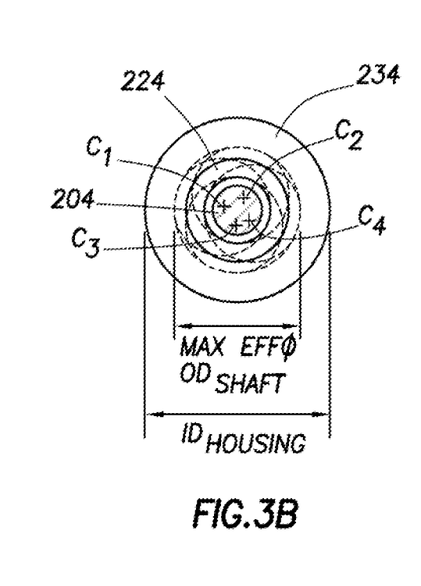
Figure 3C:
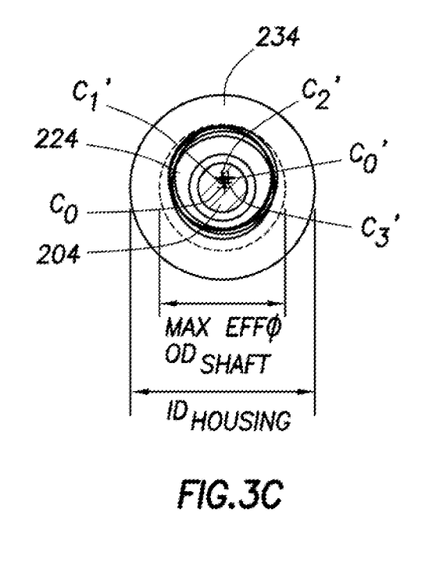

FIGS. 3A-3C are schematic diagrams depicting the floating movement of the rotating shaft 204 and seal ring 224 within the pocket 234 of FIG. 2B. In this depiction, the pin 250 and receptacles 251, 253 have been removed. The seal ring 224 of FIG. 2B has an outer diameter ($\phi OD_{seal}$). As shown in FIGS. 3A-3C, the seal ring 224 (with the rotating shaft 204 therein) has a maximum effective diameter (max $\phi OD_{seal}$) that includes the outer diameter ($OD_{seal}$) plus all of the possible eccentricities, such as machining imperfections, out of roundness error, radial displacements due to shaft vibration and wobble during operation, dynamic center offset, etc.

As also schematically shown in FIGS. 3A-3C, the seal ring 224 is positioned in the pocket 234 of the seal housing 222 and is movable therein. In this configuration, the inner diameter ($\phi ID_{housing}$) of the housing 222 is larger than the maximum effective diameter (max $\phi OD_{seal}$) to accommodate movement of the seal ring 224 within the pocket 234. A safety factor of some dimension may be provided to the inner diameter ($\phi ID_{housing}$) of the housing 222 to assure that the maximum effective diameter (max $\phi OD_{seal}$) is movable therein as set forth in the following equation:

$$\phi ID_{housing} \geq \max \phi OD_{seal} + SF \qquad \text{Equation 5}$$

The safety factor (SF) may be provided to prevent contact between the outer diameter ($\phi OD_{seal}$) of the seal ring 224 and the inner diameter ($\phi ID_{housing}$) of the housing 222.

FIG. 3A shows the seal ring 224 having a center ($C_0$) in an original, central position within the pocket 234 of housing 222. As shown in FIG. 3B, the seal ring 224 may move within the maximum effective diameter (max $\phi OD_{seal}$) such that the center ($C_0$) moves to, for example, positions $C_1, C_2, C_3, C_4$ as schematically depicted. As shown in FIG. 3C, the seal ring 224 may move from the original center position ($C_0$) to an offset position ($C_0'$) due to, for example, dynamic center offset. The seal ring 224 may wobble about this offset position ($C_0'$) to positions, such as $C_1', C_2',$ and $C_3'$. The seal ring 224 reaches the maximum effective diameter (max $\phi OD_{seal}$) at $C_3'$, where the outer diameter ($\phi OD_{seal}$) of the seal ring 224 reaches the maximum effective diameter (max $\phi OD_{seal}$). Preferably, the seal ring 224 remains within the housing inner diameter $\phi ID_{housing}$ without contacting the housing 222 even at the maximum effective diameter (max $\phi OD_{seal}$).

FIGS. 4A-4D are schematic diagrams depicting another view of the floating movement of a rotating shaft 204 and the seal ring 224 of the seal assembly 202 of FIG. 2B. The seal ring 224 (with rotating shaft 204 therein) of FIGS. 4A-4D operate in the same manner as described with respect to FIGS. 3A-3C. As shown in these figures, the seal housing 222 may be of any shape, such as rectangular as shown.

Figure 4A:
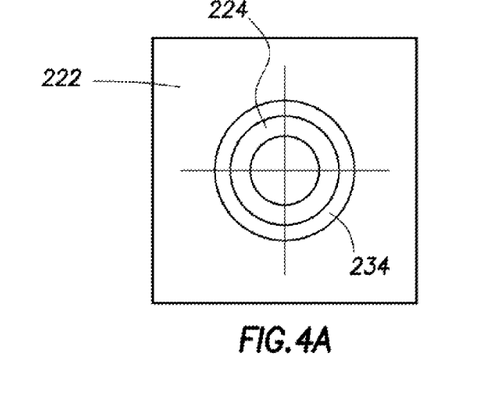
FIGS. 4A-4D are schematic diagrams depicting an alternate view of the operation of the seal assembly of FIG. 2A.
Figure 4B:
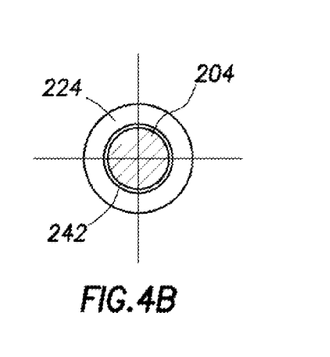
Figure 4C:
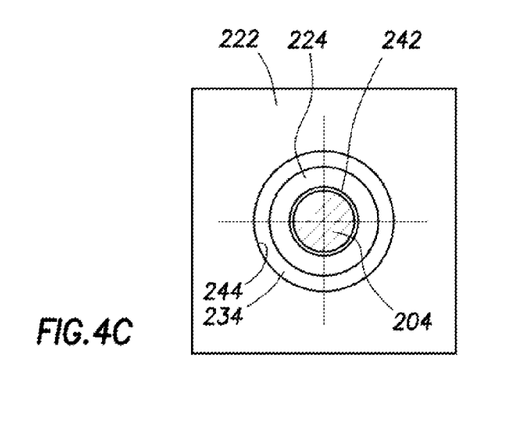
Figure 4D:
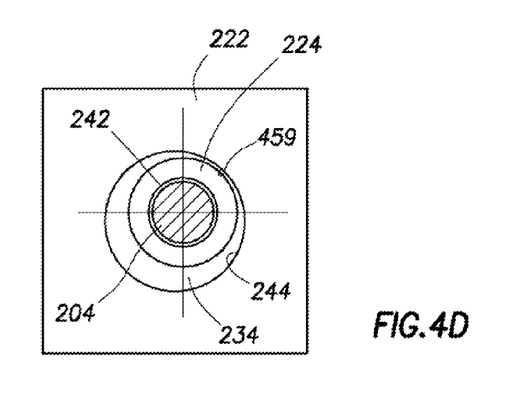

FIG. 4A shows the seal housing 222 with the oversized pocket 234 therein. FIG. 4B shows the seal ring 224 positioned about the rotating shaft 204. FIG. 4C shows the seal ring 224 positioned in the oversized pocket 234 of seal housing 222 with the rotating shaft 204 therethrough. Shaft clearance 242 provides spacing between the rotating shaft 204 and the seal ring 224. FIG. 4D shows the rotating shaft 204 and seal ring 224 offset within the oversized pocket 234.

As shown in FIGS. 4A-4D, a minimum gap (min $g_{seal}$) 459 remains between the outer diameter of seal ring 224 and the inner diameter of housing 222 such that no contact occurs therebetween. This configuration demonstrates that the oversize pocket 234 is larger than the seal ring 224 to permit the seal ring to float therein. The seal ring 224 is positioned about the rotating shaft 204, but movable within the oversized pocket 234. Because the minimum gap (min $g_{seal}$) 459 exists between the seal ring 224 and the housing 222, the seal ring 104 is permitted to drift or float therein. The seal ring 224 moves from a centered position within pocket 234 as shown in FIG. 4C, to an offset position within pocket 234 as shown in FIG. 4D. As also shown in FIG. 4D, the minimum gap (min $g_{seal}$) 459 remains between the seal ring 224 and the housing 222 to prevent contact therebetween.

The seal ring 224 is permitted to float freely and 'self-adjust' to a desired position within the pocket 234. The seal ring 224 (and rotating shaft 204) moves in response to vibration, offset, wobble, or other movement about the machine 100. For example, the seal ring 224 is permitted to move within the pocket 234 in response to wobble as depicted in FIG. 3B. The seal ring 224 may also shift in response to dynamic center offset as depicted in FIG. 3C. The flexibility of the seal ring 224 allows for further self-adjustment. The seal ring 224 may flex around the rotating shaft 204 and within the pocket 234 to create a seal therebetween to restrict the fluid flow. As the rotating shaft 204 moves, the seal ring 224 repositions therewith, thereby remaining in position to seal about the rotating shaft 204. This configuration is provided to enable components of the seal assembly to 'self-adjust' to operating conditions as they occur.

Figure 5:
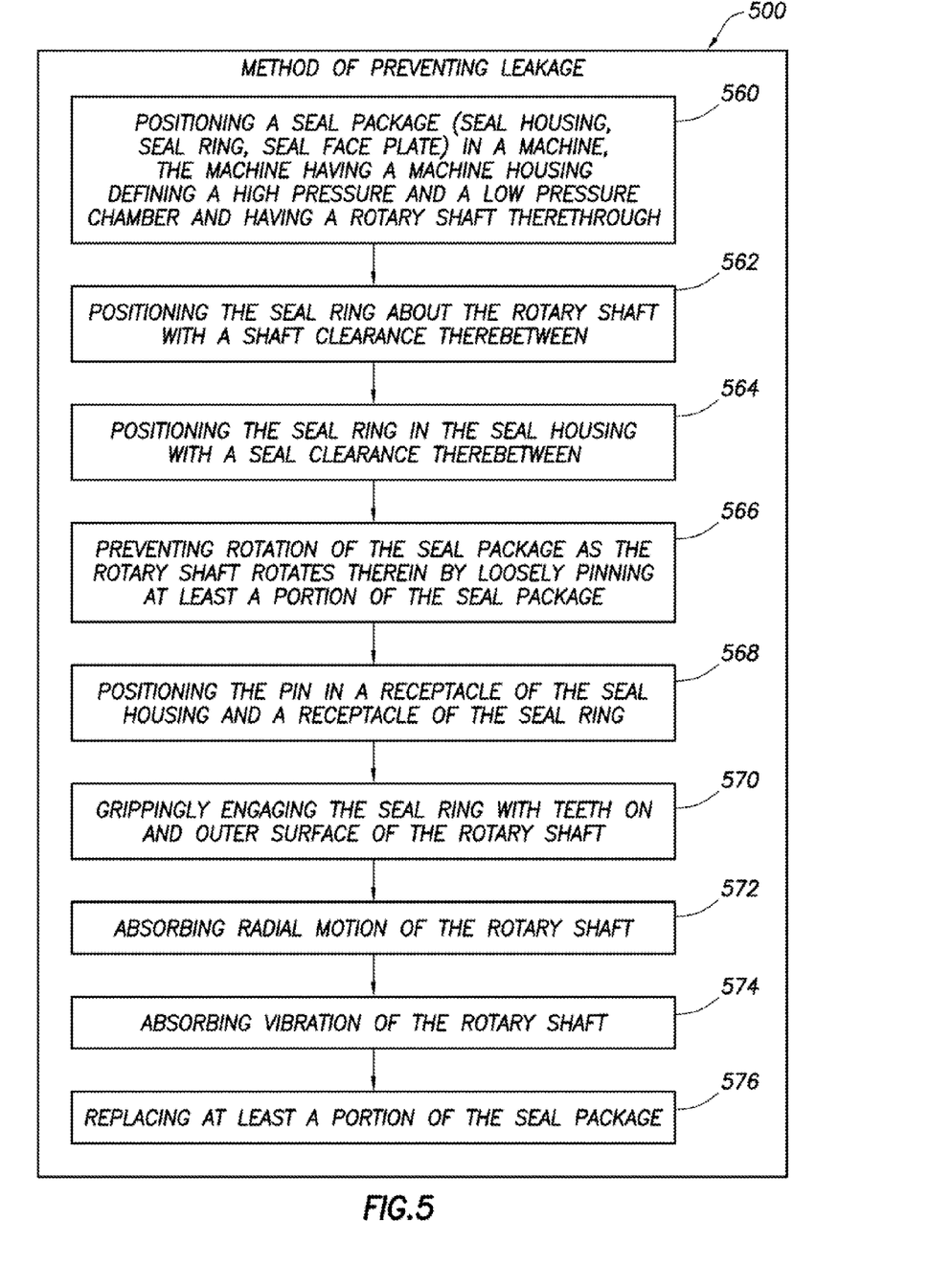
FIG. 5 is a flow chart depicting a method of sealing a machine.

FIG. 5 is a flow chart depicting a method 500 of sealing, for example, the machine 101 of FIG. 1. The method involves positioning 560 a seal package (e.g., 220 with seal housing 222, seal ring 224, and seal face plate 226) in a machine (e.g., 100). The positioning (560) may involve positioning (562) the seal ring about the rotating shaft with a shaft clearance (e.g., 242) therebetween, and/or positioning (564) the seal ring in the seal housing with a seal clearance (e.g., 244) therebetween.

The method may further involve preventing (566) rotation of the seal package as the rotating shaft rotates therein by loosely pinning at least a portion of the seal package. The pinning may involve positioning (568) a pin loosely (e.g., 250) in a receptacle of the seal ring (e.g., 251) and a receptacle of the seal housing (e.g., 222), after aligning the two receptacles to be adjacent (across from) each other.

The method may further involve grippingly engaging (570) the seal ring with teeth (e.g., 238) on an outer surface of the rotating shaft, absorbing (572) radial motion of the rotating shaft with the seal package, absorbing (574) vibration of the rotating shaft with the seal package, and replacing (576) at least a portion of the seal package. The steps may be performed in any order, and one or more of the steps may be repeated as desired.

It will be understood from the foregoing description that various modifications and changes may be made in the preferred and alternative embodiments of the present invention without departing from its true spirit. For example, the system may be provided one or more seal housings, seal face plates and/or seal rings in the machine housing and about the rotating shaft.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A seal assembly for sealing a machine, the machine having a machine housing having a first chamber with a fluid therein and a second chamber, a rotating shaft extending through the first chamber and the second chamber of the machine housing and rotating therein, the seal assembly comprising:

a seal housing positionable in the machine housing with the rotating shaft therethrough, the seal housing having a seal pocket extending into a fluid side thereof and an opening facing the first chamber; and the seal housing having a housing receptacle extending into the seal housing from an inner diameter of the seal housing at the seal pocket;

a seal ring positionable in the seal pocket of the seal housing with the rotating shaft therethrough for forming a seal therewith, the seal ring having a ring receptacle extending into the seal ring from an outer diameter of the seal ring, the ring receptacle positionable adjacent to the housing receptacle for defining a pin hole therebetween; and a seal pin loosely positionable in the pin hole and movable therein whereby movement about the seal ring in the seal housing is accommodated while preventing rotation of the seal ring when the shaft rotates wherein the seal assembly further comprises a seal face plate covering the seal pocket opening and positionable adjacent the seal housing on the fluid side thereof with the rotating shaft therethrough, the seal face plate positioned adjacent the seal ring for retaining both the seal ring and the seal pin in the seal pocket.

2. The seal assembly of claim 1, wherein the seal pin is movable between the seal housing and the seal face plate.

3. The seal assembly of claim 1, further comprising an o-ring positionable between the seal housing and the seal face plate.

4. The seal assembly of claim 1, wherein the seal receptacle extends along a width of the outer diameter of the seal ring.

5. The seal assembly of claim 1, wherein the housing receptacle extends along a width of the inner diameter of the seal housing at the housing pocket.

6. The seal assembly of claim 1, wherein the housing receptacle has a semi-circular shape.

7. The seal assembly of claim 1, wherein the ring receptacle has a semi-circular shape.

8. The seal assembly of claim 1, wherein the seal pin is positionable parallel to the rotating shaft.

9. The seal assembly of claim 1, wherein a shaft clearance is selectively defined between an outer diameter of the rotating shaft and an inner diameter of the seal ring for restricting passage of the fluid therethrough whereby leakage of the fluid is selectively controlled.

10. The seal assembly of claim 1, wherein a seal clearance is selectively defined between the inner diameter of the seal housing at the seal pocket and an outer diameter of the seal ring to enable the seal ring to float within the seal pocket whereby movement is accommodated as the seal ring is maintained in a sealing position.

11. The seal assembly of claim 1, wherein the seal ring comprises graphite.

12. A seal assembly for sealing a machine, the machine having a machine housing having a first chamber with a fluid therein and a second chamber, a rotating shaft extending through the first chamber and the second chamber of the machine housing and rotating therein, the seal assembly comprising:

a seal housing positionable in the machine housing with the rotating shaft therethrough, the seal housing having a seal pocket extending into a fluid side thereof and having an opening facing the first chamber; and the seal housing having a housing receptacle extending into the seal housing from an inner diameter of the seal housing at the seal pocket;

a seal ring positionable in the seal pocket of the seal housing with the rotating shaft therethrough for forming a seal therewith, the seal ring having a ring receptacle extending into the seal ring from an outer diameter of the seal ring, the ring receptacle positionable adjacent to the housing receptacle for defining a pin hole therebetween; and a seal pin loosely positionable in the pin hole and movable therein whereby movement about the seal ring in the seal housing is accommodated while preventing rotation thereof;

wherein a shaft clearance is selectively defined between an outer diameter of the rotating shaft and an inner diameter of the seal ring for restricting passage of the fluid therethrough whereby leakage of the fluid is selectively controlled.

13. The seal assembly of claim 12, wherein a seal clearance is selectively defined between the inner diameter of the seal housing at the seal pocket and an outer diameter of the seal ring to enable the seal ring to float within the seal pocket whereby movement is accommodated as the seal ring is maintained in a sealing position.

14. The seal assembly of claim 12, further comprising a seal face plate positionable adjacent the seal housing on the fluid side thereof with the rotating shaft therethrough, the seal face plate positioned adjacent the seal ring for retaining the seal ring in the seal pocket.

15. The seal assembly of claim 12, wherein the seal ring engages a plurality of teeth positioned on an outer surface of the rotating shaft.

16. A seal assembly for sealing a machine, the machine having a machine housing having a first chamber with a fluid therein and a second chamber, a rotating shaft extending through the first chamber and the second chamber of the machine housing and rotating therein, the seal assembly comprising:

a seal housing positionable in the machine housing with the rotating shaft therethrough, the seal housing having a seal pocket extending into a fluid side thereof and having an opening facing the first chamber; and the seal housing having a housing receptacle extending into the seal housing from an inner diameter of the seal housing at the seal pocket;

a seal ring positionable in the seal pocket of the seal housing with the rotating shaft therethrough for forming a seal therewith, the seal ring having a ring receptacle extending into the seal ring from an outer diameter of the seal ring, the ring receptacle positionable adjacent to the housing receptacle for defining a pin hole therebetween; and a seal pin loosely positionable in the pin hole and movable therein whereby movement about the seal ring in the seal housing is accommodated while preventing rotation thereof;

wherein a seal clearance is selectively defined between the inner diameter of the seal housing at the seal pocket and an outer diameter of the seal ring to enable the seal ring to float within the seal pocket whereby movement is accommodated as the seal ring is maintained in a sealing position.

17. The seal assembly of claim 16, wherein a shaft clearance is selectively defined between an outer diameter of the rotating shaft and an inner diameter of the seal ring for restricting passage of the fluid therethrough whereby leakage of the fluid is selectively controlled.

18. The seal assembly of claim 16, wherein the seal ring is movable within the seal pocket and within a maximum effective seal diameter.

19. The seal assembly of claim 18, wherein the maximum effective seal diameter is less than the inner diameter of the seal housing at the pocket.

20. The seal assembly of claim 18, wherein the inner diameter of the seal housing at the seal pocket is at least as large as the maximum effective seal diameter plus a safety factor.

21. The seal assembly of claim 16, further comprising a seal face plate positionable adjacent the seal housing on the fluid side thereof with the rotating shaft therethrough and covering the opening, the seal face plate positioned adjacent the seal ring for retaining the seal ring in the seal pocket.

* * * * *